US006810357B2

(12) United States Patent
Tang et al.

(10) Patent No.: US 6,810,357 B2
(45) Date of Patent: Oct. 26, 2004

(54) SYSTEMS AND METHODS FOR MINING MODEL ACCURACY DISPLAY FOR MULTIPLE STATE PREDICTION

(75) Inventors: Zhaohui Tang, Bellevue, WA (US); Pyungchul Kim, Snoqualmie, WA (US)

(73) Assignee: Microsoft Corporation, Redmond, WA (US)

(*) Notice: Subject to any disclaimer, the term of this patent is extended or adjusted under 35 U.S.C. 154(b) by 97 days.

(21) Appl. No.: 10/185,049

(22) Filed: Jun. 28, 2002

(65) Prior Publication Data

US 2004/0002833 A1 Jan. 1, 2004

(51) Int. Cl.[7] ............................................. G06F 15/00
(52) U.S. Cl. ....................................................... 702/181
(58) Field of Search ........................... 702/181, 3, 4; 703/2, 12; 345/848, 440; 455/446; 704/255; 250/461; 706/45, 931, 21; 709/332, 232; 424/185; 600/300; 342/26; 705/7; 364/551, 541, 513, 440

(56) References Cited

U.S. PATENT DOCUMENTS 6,473,084 B1 * 10/2002 Phillips et al. .............. 345/440
6,535,817 B1 * 3/2003 Krishnamurti ................ 702/3

2002/0042786 A1 * 4/2002 Scarborough et al. ........ 706/21

OTHER PUBLICATIONS

Jackson, J., "Data Mining: A Conceptual Overview", *Communications of the Association for Information Systems*, 2002, 8, 267–296 (Pertinent pp. 287–289).

Lo, V.S.Y., "The True Lift Model– A Novel Data Mining Approach to Response Modeling in Database Marketing", *SIGKDD Explorations*, 4(2), 78–86.

Piatetsky–Shapiro,G. et al., "Measuring Lift Quality in Database Marketing", *SIGKDD Explorations*, 2000, 2(2), 76–80.

*SIGKDD Explorations*, Newsletter of the ACM Special Interest Group on Knowledge Discovery and Data Mining, Dec. 2002, 4(2), 9 pages, http://ww.acm.org/sigs/sigkdd/explorations/issue4–2/contents.htm.

* cited by examiner

*Primary Examiner*—John Barlow
*Assistant Examiner*—Tung Lau
(74) *Attorney, Agent, or Firm*—Woodcock Washburn LLP

(57) ABSTRACT

Systems and methods are provided for producing a mining model accuracy display that depicts the model's accuracy at predicting a state for a multiple-state variable. The model predicts a state and provides an associated probability for each case. Points are graphed such that one coordinate of the data point corresponds to a number N of cases and the other coordinate corresponds to the number of correct predictions made in the top N cases by probability.

9 Claims, 6 Drawing Sheets

US 6,810,357 B2

SYSTEMS AND METHODS FOR MINING MODEL ACCURACY DISPLAY FOR MULTIPLE STATE PREDICTION

FIELD OF THE INVENTION

The present invention relates to systems and methods for evaluating and displaying the reliability of a data mining model which predicts the state of a variable with multiple possible states. More particularly, the present invention relates to systems and methods for displaying the accuracy of one or more predictive models in a data mining context.

BACKGROUND OF THE INVENTION

Data mining is the exploration and analysis of large quantities of data, in order to discover correlations, patterns, and trends in the data. Data mining may also be used to create models that can be used to predict future data or classify existing data.

For example, a business may amass a large collection of information about its customers. This information may include purchasing information and any other information available to the business about the customer. The predictions of a model associated with customer data may be used, for example, to control customer attrition, to perform credit-risk management, to detect fraud, or to make decisions on marketing.

To create and test a data mining model, available data may be divided into two parts. One part, the training data set, may be used to create models. The rest of the data, the testing data set, may be used to test the model, and thereby determine the accuracy of the model in making predictions.

Data within data sets is grouped into cases. For example, with customer data, each case corresponds to a different customer. Data in the case describes or is otherwise associated with that customer. One type of data that may be associated with a case (for example, with a given customer) is a categorical variable. A categorical variable categorizes the case into one of several pre-defined states. For example, one such variable may correspond to the educational level of the customer. There are various values for this variable. The possible values are known as states. For instance, the states of the educational level variable may be "high school degree," "bachelor's degree," or "graduate degree" and may correspond to the highest degree earned by the customer.

As mentioned, available data is partitioned into two groups—a training data set and a testing data set. Often 70% of the data is used for training and 30% for testing. A model may be trained on the training data set, which includes this information. Once a model is trained, it may be run on the testing data set for evaluation. During this testing, the model will be given all of the data except the educational level data, and asked to predict a probability that the educational level variable for that customer is "bachelor's degree".

Running the model on the testing data set, these results are compared to the actual testing data to see whether the model correctly predicted a high probability of the "bachelor's degree" state for cases that actually have "bachelor's degree" as the state of the educational level variable. One method of displaying the success of a model graphically is by means of a lift chart, also known as a cumulative gains chart. To create a lift chart, the cases from the testing data set are sorted according to the probability assigned by the model that the variable (e.g. educational level) has the state (e.g. bachelor's degree) that was tested, from highest probability to lowest probability. Once this is done, a lift chart can be created from data points (X, Y) showing for each point what number Y of the total number of true positives (those cases where the variable does have the state being tested for) are included in the X% of the testing data set cases with the highest probability for that state, as assigned by the model.

As shown in FIG. 1, the conventional lift chart shows that there are 1000 total true positives in the testing set. This is not necessarily the number of cases in the testing data set. Some cases may have a different state for the variable than the one for which the test is being conducted. The number of true positives in the testing data set is the highest number shown on Y axis 10. The X axis 20 correlates with the percentage of cases with the highest probabilities. Lift line 30 depicts the success of the model. For example, it can be seen that lift line 30 includes a point with (X, Y) coordinates are approximately (20, 500). This indicates that, in the 20% of the cases selected by the model as the most probable cases having the tested-for state of the variable, approximately 500 of the cases that are truly positive for the state of the variable are included. This is equivalent to getting 50% of the actual cases with the desired state in only 20% of the cases for which the test is conducted.

A model that randomly assigns probabilities would be likely to have a chart close to the random lift line 40. In the top 10% of cases, such a model would find 10% of the true positives. Note that the X axis may also be expressed in the number of high probability cases, and the Y axis in percentages. A perfect model may also be considered. In a situation where there are N% true positives among the entire testing data set, the lift line would stretch straight from the origin to the point (N, $Y_{MAX}$) (where $Y_{MAX}$ is the maximum Y value). This is because all of the true positives would be identified before any false positives are identified. The lift line for the perfect model would then continue horizontally from that point to the right. For example, if 20% of the cases had the tested for state, as shown in FIG. 2, a perfect model would have the perfect lift line 50, extending from (0,0) to (20, 1000) and then from (20, 1000) to (100, 1000). Similarly, the worst case model would identify no true positives until the last N% of the testing population is included, and, as shown in FIG. 3 for the case where there are 20% true positives, the worst case lift line 60 for such a model would extend from (0,0) to (80, 0) and then straight from (80,0) to (100, 1000).

As described above, in the prior art, a lift chart can be used to display and measure the prediction accuracy of a model for a given state of a variable. However, existing lift charts have several drawbacks. Because models often must pick, for a given case and variable, what state is most probable for that variable, it is useful to know with what accuracy they can perform this prediction for all states. Lift charts in the prior art do not allow the display of the general prediction accuracy of a model for a variable over all states. A model may perform well for one state but may perform badly when predicting another. Also, in the prior art, comparing lift charts for different models to evaluate the effectiveness over the entire population will not be useful, as all conventional lift chart lines have a Y value corresponding to all of the true positives at the X value corresponding to the entire population of the testing set. This is because when all cases are considered, all true positives are included.

Thus, there is a need for improved charts with which to understand the behavior of models for predicting the state of multiple-state variables.

SUMMARY OF THE INVENTION

In view of the foregoing, the present invention provides systems and methods for creating a chart displaying the accuracy of a model in predicting the state of a multi-state variable. The most likely state of the variable for each input case is predicted, as well as its associated probability. The input cases are sorted based on the predicted probabilities, regardless of which state of the variable was predicted. A chart is created which graphs the percentage of correct predictions for the most probable cases.

Other features and embodiments of the present invention are described below.

BRIEF DESCRIPTION OF THE DRAWINGS

The system and methods for model accuracy display for multiple state prediction in accordance with the present invention are further described with reference to the accompanying drawings in which.

DETAILED DESCRIPTION OF THE INVENTION

Overview

As described in the background, the conventional lift chart can only display the effectiveness of a model at predicting one state of a multi-state variable. A method and system are presented for providing, across all possible states, a display of the accuracy of a data-mining model predicting the state of a multiple-state variable. A state is selected by the model for a variable found in the cases in the testing data set. The model also provides an associated probability for each case. The cases are sorted by the associated probability set by the model and the predicted state is compared to the actual state of the variable in each case. The percentage of correct predictions among the highest-probability cases is graphed.

Exemplary Computing Environment

Figure 1:
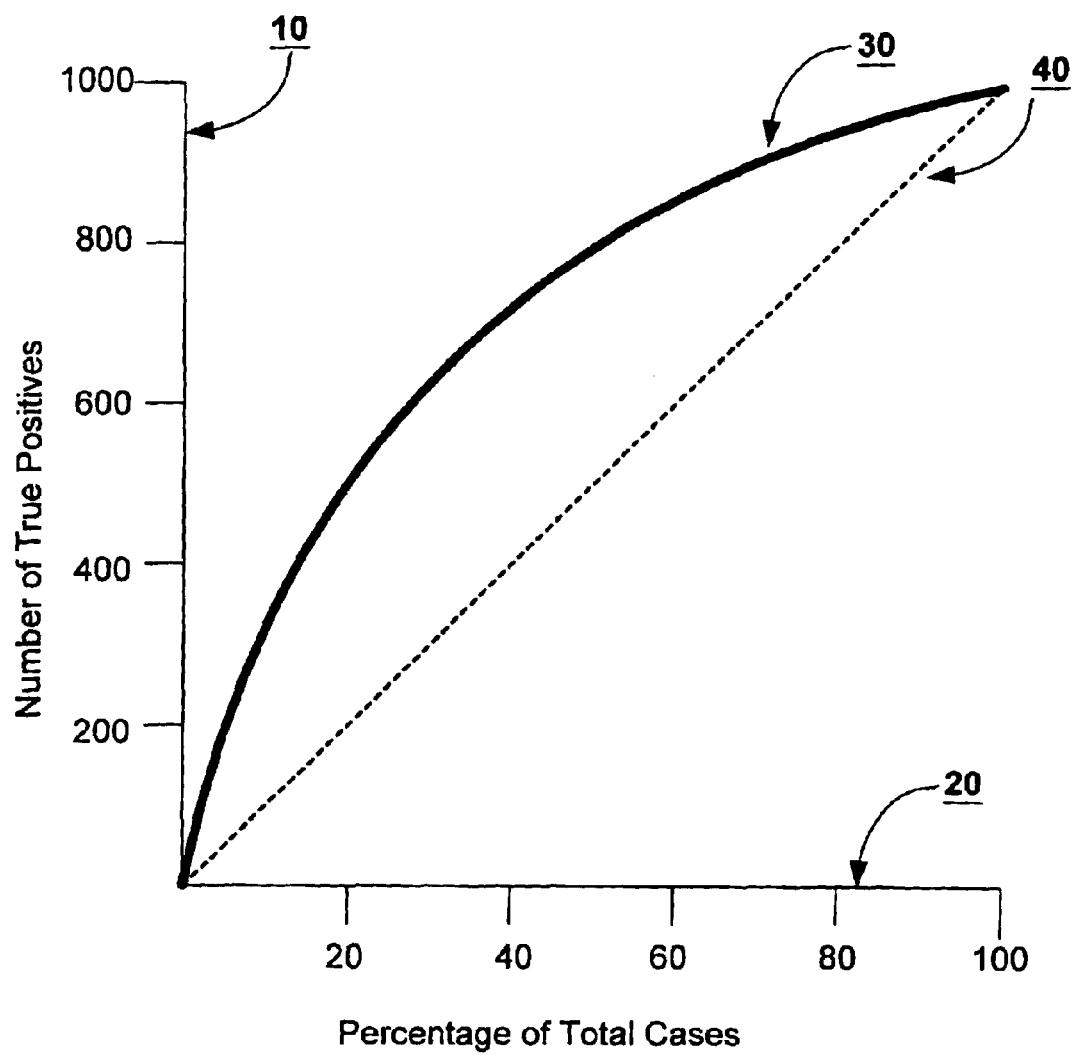
FIG. 1 is a lift chart according to the prior art with an exemplary model lift line and a random lift line depicted.
Figure 2:
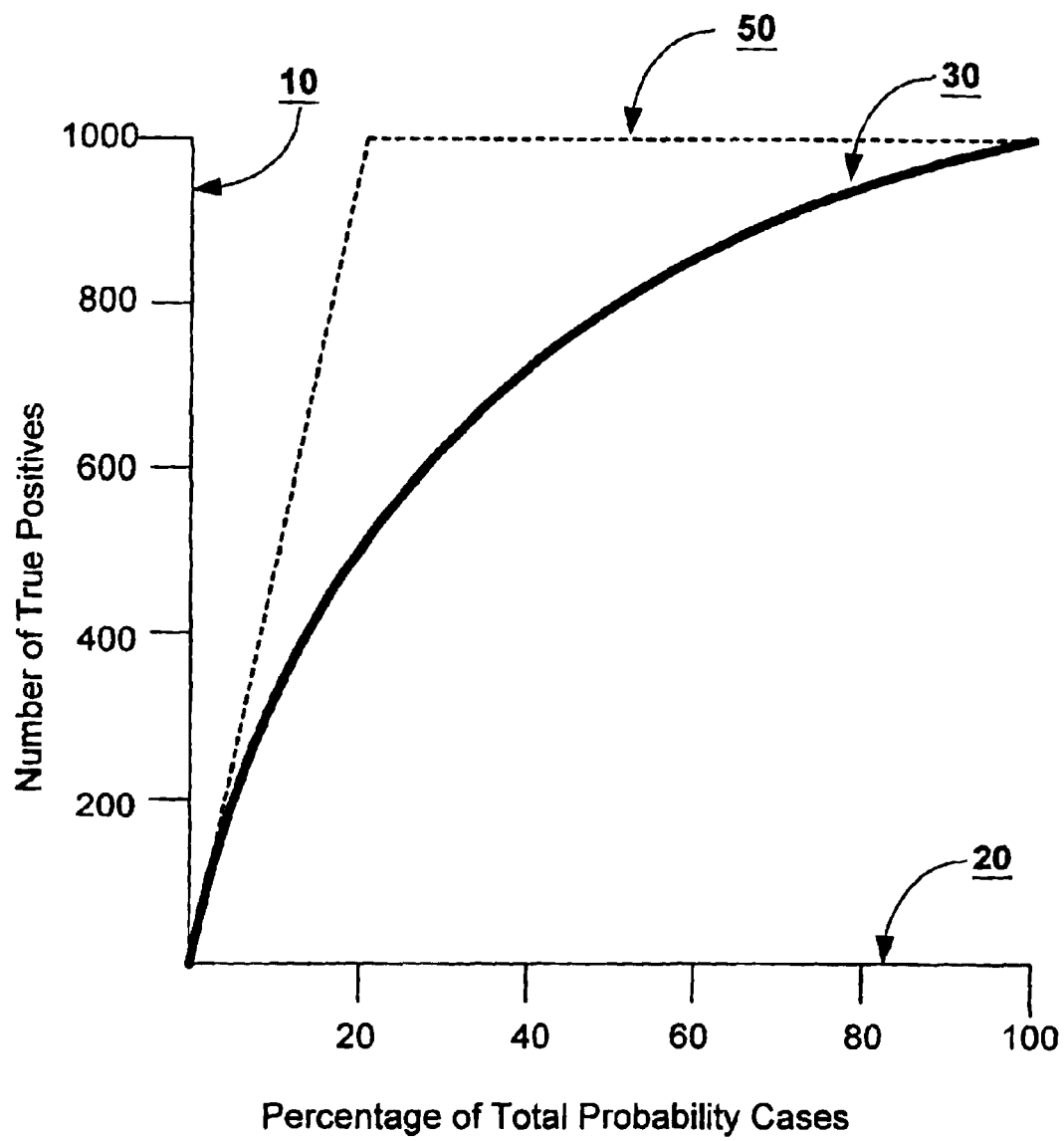
FIG. 2 is a lift chart according to the prior art with an exemplary model lift line and an ideal lift line depicted.
Figure 3:
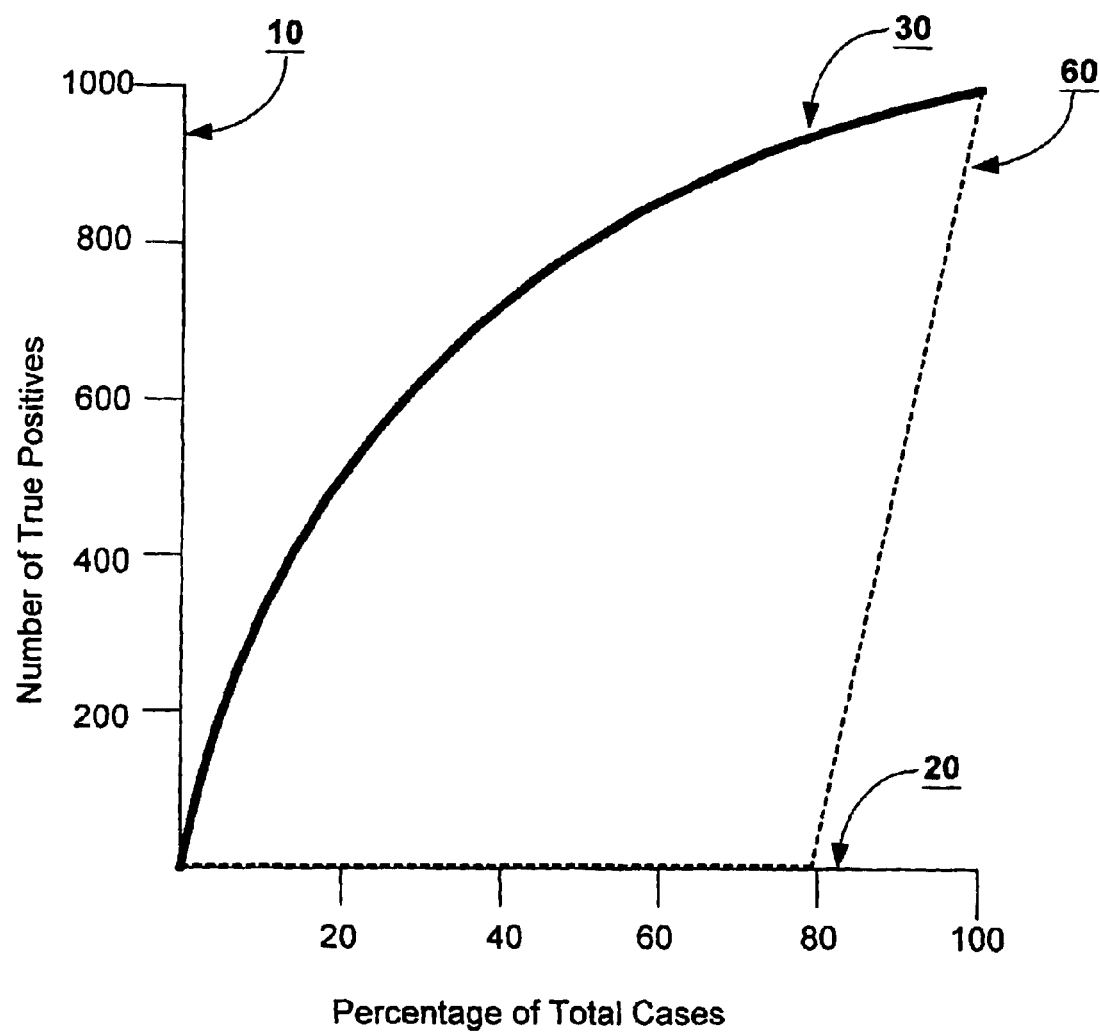
FIG. 3 is a lift chart according to the prior art with an exemplary model lift line and a worst case lift line depicted.
Figure 4:
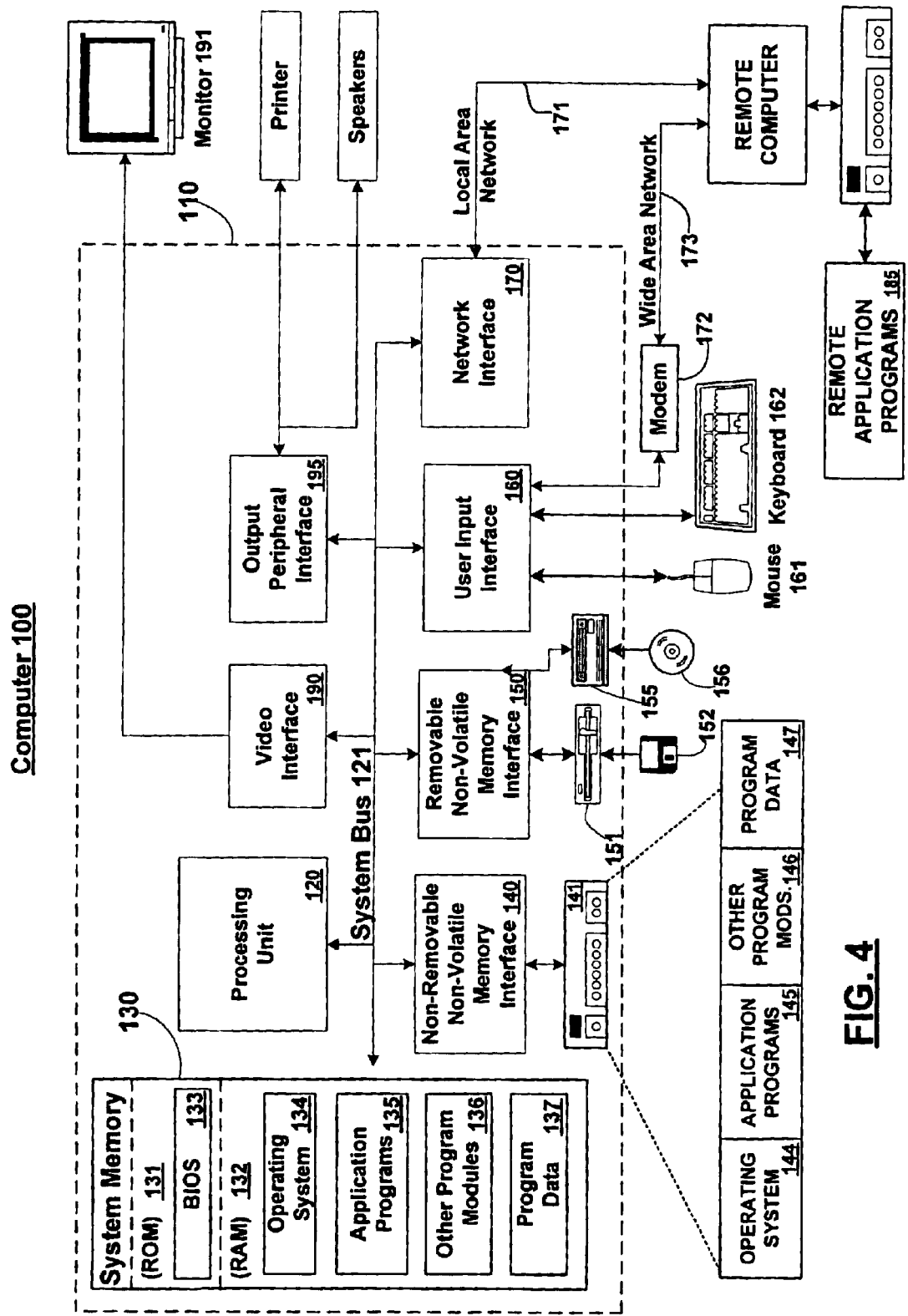
FIG. 4 is a block diagram of an exemplary computing environment in which aspects of the invention may be implemented.

FIG. 4 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention.

The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 4, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Calculation and Display of Multi-State Prediction Evaluation

In order to calculate and display an evaluation of the success of a model in predicting a multi-state variable, the inventive technique compares the predictions made on a testing set of data to the actual state of the variable, known for all cases in the testing set.

Unlike the process of preparing a conventional lift chart, for each case the model provides the state with the highest probability and that associated probability, for the given variable. For example, consider the data set where the cases are customers, variable is educational level, and the states are "high school degree," "bachelor's degree," and "graduate degree." The request to the model will be to provide most probable state for the educational level variable, and the probability that that state is correct.

Thus, information, for each case, about the predicted state of the variable and the associated probability can be gathered. Table 1, below, shows an abbreviated version of a table with this information. In that table, M customer cases are included in the training data.

TABLE 1

Customer Cases, Predicted Educational Level, and Associated Probability

| Customer | Predicted State of Educational Level Variable | Probability |
|---|---|---|
| 1 | bachelor's degree | .510 |
| 2 | graduate degree | .929 |
| 3 | bachelor's degree | .745 |
| 4 | high school degree | .767 |
| 5 | high school degree | .463 |
| 6 | bachelor's degree | . . . |
| . . . | . . . | . . . |
| M | graduate degree | .561 |

Once this table has been completed, it can be sorted by propability, and the information such as the one in Table 2 is created.

TABLE 2

Customer Cases, Predicted Educational Level, and Associated Probability

| Customer | Predicted State of Educational Level Variable | Probability |
|---|---|---|
| 225 | graduate degree | .933 |
| 871 | graduate degree | .932 |
| 125 | bachelor's degree | .931 |
| 403 | high school degree | .930 |
| 677 | bachelor's degree | .930 |
| 2 | graduate degree | .929 |
| . . . | . . . | . . . |
| M | bachelor's degree | .338 |

With this information, it is possible to examine cases by the level of certainty of the model. The computer can determine, for some percentage X, what cases are in the top X% of the training data set cases ranked by the associated probability the model has assigned. And, having determined what those cases are, the computer can determine, by consulting the actual value of the multi-state variable for the cases in the training data set, what percentage Y of the total training data set was predicted correctly by the model. Graphing these X and Y values yields a display of the accuracy of the model on multi-state prediction over all states.

Figure 5:
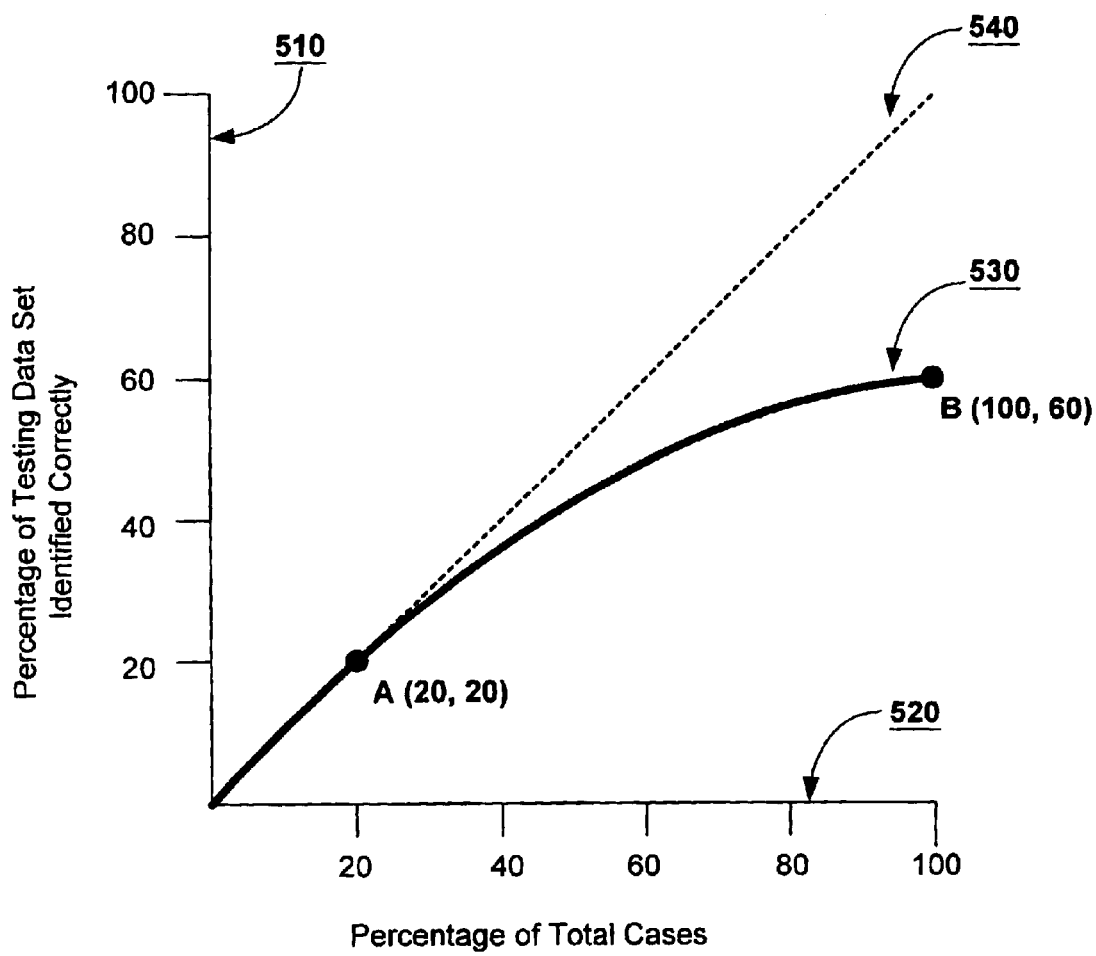
FIG. 5 is a chart according to the present invention with a multi-state prediction evaluation line and an ideal multi-state prediction line depicted.

FIG. 5 shows such a multi-state prediction evaluation display. X axis 520 corresponds to the percentage of total cases being considered. These cases are the cases to which the model has assigned the highest probability of correctness of the model's selected state. Y axis 510 corresponds to the percentage of correct identifications of the testing data set contained within the cases being examined. Multi-state prediction evaluation line 530 is an exemplary multi-state prediction evaluation line. This line represents at point A that for the 20% of the testing data set for which the model was the most certain, the model had perfect accuracy, with 20% of the testing data set being identified correctly within that first 20% of the model's predictions. However, the model's accuracy decreases as the associated probability of the guesses decreases, and point B represents that when the entire set of predictions is considered (where X=100) the model identifies the correct state for approximately only 60% of the cases in the testing data set (Y=60).

FIG. 5 also includes the ideal multi-state prediction evaluation line 540. This line indicates that a perfect model would identify 20% of the testing data set correctly in the top 20% most certain predictions, 50% in the top 50%, and 100% in the top 100%. The worst-case multi-state prediction evaluation line would never get any of the state predictions correct, and it would lie overlapping the X axis. A multi-state prediction evaluation line for a model that selects states randomly can be seen as random multi-state prediction evaluation line 550 in FIG. 6. This random multi-state prediction line is for a variable with 3 possible states. At point C, it can be seen that when 100% of the cases are considered, such a model is likely to get approximately ⅓ of them correct.

Figure 6:
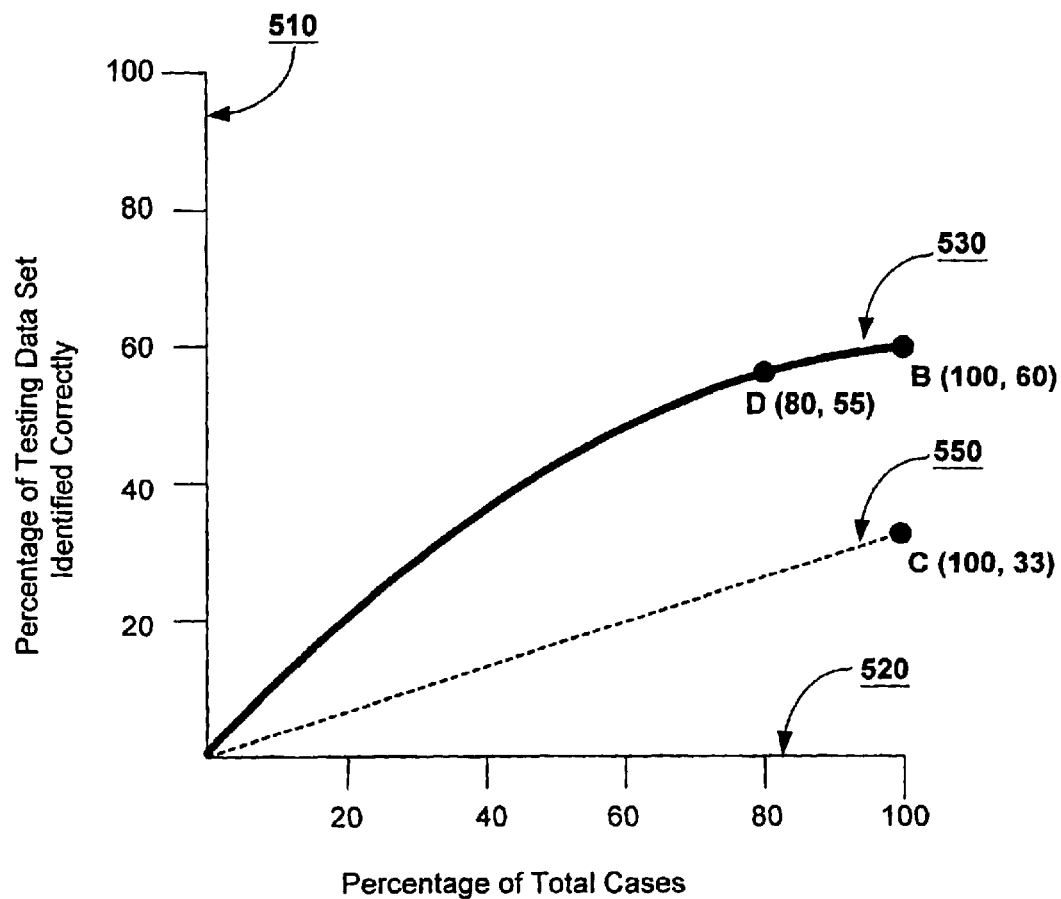
FIG. 6 is a chart according to the present invention with a multi-state prediction evaluation line and a random multi-state prediction line depicted.

It can be seen in FIG. 6 that the random multi-state prediction evaluation line 550 indicates that the random model has constant accuracy over all of the data. Multi-state prediction evaluation line 540, on the other hand, indicates that the model to which it corresponds has a higher success rate for the cases to which it had assigned a higher probability of correctness. When comparing point D to point B, the multi-state prediction evaluation line 540 shows that the model's success rate with 80% of the cases considered is similar to that with 100% considered. A model is possible that has a constant rate of success, regardless of the associated probability the model assigns to correctness of the state it has selected for the multi-state variable. It is, of course, also possible that a model correctly performs better on cases to which it assigns a lower associated probability. All of these situations can be represented with multi-state prediction evaluation lines according to the invention.

More than one multi-state prediction evaluation lines may be displayed on a single display. This is useful, for example, in order to compare the accuracy of different models, or, in cases where there are multiple testing data sets with different characteristics, to compare the accuracy of a single model on the different testing data sets.

Additionally, the display may be customized to user specifications. If a user wished to only see the accuracy of the model over a specific range of the testing set—for example, if the user wished to only see the accuracy of the model on the cases for which the associated probability of correctness was among the top half of the sorted probabilities, a section of the chart may be presented. Additionally, the relative scale of the axes could be modified. The axes could be changed to display number of cases rather than percentage. The graph could also be modified to display the difference between two models in the Y value rather than displaying each of the two models.

The multi-state prediction evaluation line may be produced using approximations. For example, where there are 10,000 cases in the testing data set, it may be that the line may be produced by examining the top one hundred cases (by associated probability), then the top two hundred cases, then the top three hundred cases, etc., instead of evaluating the accuracy with the top case, the top two cases, the top three cases, etc. In this way, computational time may be saved for a small cost in accuracy. Not all points (X, Y) on the line must be exact, and the line may be produced using prior art algorithms for creating a representative line from data points. In place of lines, data points may be displayed. Equivalent graphs may be produced as is known in the prior art, by changing the scale of the axes, or by changing the position of the axes.

These and other possible variations that would be obvious to one skilled in the art are contemplated, and the invention should not be limited to any single embodiment.

Conclusion

Herein a system and method for mining model accuracy display for multiple state prediction is provided that produces a display by graphing the percentage of the total population for which the correct state was selected by the mining model in a specified percentage of the cases in the data tested. The specified percentage is selected from the data by selecting those cases with the highest predicted probability of correctness, as predicted by the model.

The invention also contemplates placing more than one multi-state prediction evaluation lines on a single graph in order to compare and contrast the accuracy of more than one model, or to compare and contrast the accuracy of one model on several testing data sets, which may have been selected for various attributes of the data sets.

As mentioned above, while exemplary embodiments of the present invention have been described in connection with various computing devices and network architectures, the underlying concepts may be applied to any computing device or system in which it is desirable to have a display of the accuracy of a data mining model over multiple states of a multi-state variable. Thus, the techniques for providing such a display in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent parametrization achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for accuracy display for a data mining model, where said model predicts, for each case in a testing data set, a specific state from among a state set of at least two possible states and where said model determines an associated probability for each of said predictions, and where the correctness of said prediction is verifiable, comprising:

producing a visual representation of a multi-state prediction evaluation on a graph of at least two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said data point set, and (3) a second coordinate of said data points corresponds to the number of correct predictions for cases contained in said data point set; and wherein, for each of said data points, said first coordinate is equal to the percentage of said cases in said testing data set which are contained in said data point set.

2. A method for accuracy display for a data mining model, where said model predicts, for each case in a testing data set, a specific state from among a state set of at least two possible states and where said model determines an associated probability for each of said predictions, and where the correctness of said prediction is verifiable, comprising:

producing a visual representation of a multi-stage prediction evaluation on a graph of at lest two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said data point set, and (3) a second coordinate of said data points corresponds to the number of correct predictions for cases contained in said data point set; and wherein, for each of said data points, said second coordinate is equal to the percentage of said cases in said testing data set for which said prediction associated with said cases contained in said data point set is correct.

3. A method for accuracy display for a data mining model, where said model predicts, for each case in a test data set, a specific state from among a state set of at least two possible states and where said model determines an associated probability for each of said predictions, and where the correctness of said prediction is verifiable, comprising:

producing a visual representation of a multi-state prediction evaluation on a graph of at least two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said data point set, and (3) a second coordinate of said data points corresponds to the number of correct predictions for cases contained in said data point set; and producing, on said graph, the visual representation of a multi-state prediction evaluation corresponding to a random model.

4. A computer-readable medium comprising computer-executable modules having computer-executable instructions for accuracy display for a data mining model, where said model predicts, for each case in a test data set, a specific state from among a state set of a least two possible states and where said model determines an associated probability for each of said predictions, and where the correctness of said prediction is verifiable, said modules comprising:

a module for producing a visual representation of a multi-state prediction evaluation on a graph of at least two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said point set, and (3) a second coordinate of said data point corresponds to the number of correct predictions for cases contained in said data point set, wherein, for each of said data points, said first coordinate is equal to the percentage of said cases in said testing data set which are contained in said data point set.

5. A computer-readable medium comprising computer-executable modules having computer-executable instructions for accuracy display for a data mining model, where said model predicts, for each case in a testing data set, a specific state from among a state set of at least two possible states and where said model determines an associated probability for each of said predictions, and where the correctness of said prediction is verifiable, said modules comprising:

a module for producing a visual representation of a multi-state prediction evaluation on a graph of at least two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said data point set, and (3) a second coordinate of said data points corresponds to the number of correct predictions for cases contained in said data point set, wherein, for each of said data points, said second coordinate is equal to the percentage of said cases in said testing data set for which said prediction associated with said cases contained in said data point set is correct.

6. A computer-readable medium comprising computer-executable modules having computer-executable instructions for accuracy display for a data mining model, where said model predicts, for each case in a testing data set, a specific state from among a state set of at least two possible states and where said model determines an associated probability for each of said predictions, and where the correctness of said prediction is verifiable, said modules comprising:

a module for producing a visual representation of a multi-state prediction evaluation on a graph of at least two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said data point set, and (3) a second ordinate of said data points corresponds to the number of correct predictions for cases contained in said data point set; and a module for producing, on said graph, the visual representation of a multi-state prediction evaluation corresponding to a random model.

7. A computer device for accuracy display for a data mining model, where said model predicts, for each case in a test data set, a specific state from among a state set of at least two possible states and where said model determines an associated probability for each of said predictions, and where the correctness of said prediction is verifiable, comprising:

means for producing a visual representation of a multi-state prediction evaluation on a graph of at least two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said data point set, and (3) a second coordinate of said data points corresponds to the number of correct predictions for cases contained in said data point set, wherein, for each of said data points, said first coordinate is equal to the percentage of said cases in said testing data set which are contained in said data point set.

8. A computer device for accuracy display for a data mining model, where said model predicts, for each case in a test data set, a specific state from among a state set of at least two possible states and where said model determines an associated probability for each of said predictions, and where the correctness of said predication is verifiable, comprising:

means for producing a visual representation of a multi-state prediction evaluation on a graph of at least two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said data point set, and (3) a second coordinate of said data points corresponds to the number of correct predictions for cases contained in said data point set, wherein, for each of said data points, said second coordinate is equal to the percentage of said cases in said testing data set for which said prediction associated with said cases contained in said data point set is correct.

9. A computer device for accuracy display for a data mining model, where said model predicts, for each case in a test data set, a specific state from among a state set of at least two possible states and where said model determines an associated probability for each of said predictions, and where the correctness of said prediction is verifiable, comprising:

means for producing a visual representation of a multi-state prediction evaluation on a graph of at least two dimensions comprising at least two data points where for each of said data points: (1) a data point set of said cases from among said testing data set has been selected such that no case in said data point set has a lower associated probability for the prediction made by said model than any case not in said data point set, (2) a first coordinate of said data points corresponds to the number of cases in said data point set, and (3) a second coordinate of said data points corresponds to the number of correct predictions for cases contained in said data point set; and means for producing, on said graph, the visual representation of a multi-state prediction evaluation corresponding to a random model.

\* \* \* \* \*

UNITED STATES PATENT AND TRADEMARK OFFICE
CERTIFICATE OF CORRECTION

PATENT NO. : 6,810,357 B2
APPLICATION NO. : 10/185049
DATED : October 26, 2004
INVENTOR(S) : Zhaohui Tang et al.

It is certified that error appears in the above-identified patent and that said Letters Patent is hereby corrected as shown below:

On the title page, item (56), under "Other Publications" in column 2, line 12, delete "ww.acm.org" and insert -- www.acm.org --, therefor.

In column 7, line 17, delete "propability" and insert -- probability --, therefor.

In column 10, line 55, in Claim 1, after "and" insert -- , --.

In column 10, line 65, in Claim 2, delete "producting" and insert -- producing --, therefor.

In column 10, line 65, in Claim 2, delete "multi-stage" and insert -- multi-state --, therefor.

In column 10, line 66, in Claim 2, delete "lest" and insert -- least --, therefor.

In column 11, line 10, in Claim 2, after "and" insert -- , --.

In column 11, line 15, in Claim 3, delete "test" and insert -- testing --, therefor.

In column 11, line 38, in Claim 4, delete "test" and insert -- testing --, therefor.

In column 11, line 39, in Claim 4, after "of" delete "a" and insert -- at --, therefor.

In column 11, line 53, in Claim 4, delete "point" and insert -- points --, therefor.

In column 12, line 37, in Claim 6, delete "ordinate" and insert -- coordinate --, therefor.

In column 12, line 45, in Claim 7, delete "test" and insert -- testing --, therefor.

UNITED STATES PATENT AND TRADEMARK OFFICE
CERTIFICATE OF CORRECTION

PATENT NO.         : 6,810,357 B2
APPLICATION NO.    : 10/185049
DATED              : October 26, 2004
INVENTOR(S)        : Zhaohui Tang et al.

It is certified that error appears in the above-identified patent and that said Letters Patent is hereby corrected as shown below:

In column 13, line 1, in Claim 8, delete "test" and insert -- testing --, therefor.

In column 14, line 1, in Claim 9, delete "test" and insert -- testing --, therefor.

Signed and Sealed this

Seventh Day of April, 2009

JOHN DOLL
*Acting Director of the United States Patent and Trademark Office*